United States Patent
Ko

(10) Patent No.: US 10,492,055 B2
(45) Date of Patent: Nov. 26, 2019

(54) BLUETOOTH ADVERTISING PROCESSING TECHNIQUES

(71) Applicant: MEDIATEK INC., Hsin-Chu (TW)

(72) Inventor: Li-Chun Ko, Hsin-Chu (TW)

(73) Assignee: MEDIATEK, INC., Hsin-Chu (TW)

( * ) Notice: Subject to any disclaimer, the term of this patent is extended or adjusted under 35 U.S.C. 154(b) by 0 days.

(21) Appl. No.: 16/003,884

(22) Filed: Jun. 8, 2018

(65) Prior Publication Data

US 2018/0359627 A1 Dec. 13, 2018

Related U.S. Application Data

(60) Provisional application No. 62/518,016, filed on Jun. 12, 2017.

(51) Int. Cl.
*H04W 4/80* (2018.01)
*H04W 4/06* (2009.01)
*H04W 8/00* (2009.01)
*H04L 29/08* (2006.01)

(52) U.S. Cl.
CPC .......... *H04W 8/005* (2013.01); *H04W 4/80* (2018.02)

(58) Field of Classification Search
CPC ........ H04L 67/16; H04L 67/303; H04W 4/06; H04W 4/80; H04W 8/005
See application file for complete search history.

(56) References Cited

U.S. PATENT DOCUMENTS

| | | | |
|---|---|---|---|
| 2001/0004733 A1* | 6/2001 | Eldering | G06Q 20/20 705/14.41 |
| 2008/0046920 A1* | 2/2008 | Bill | G06Q 30/02 725/34 |
| 2011/0238507 A1* | 9/2011 | Ben-Rubi | G06Q 30/0277 705/14.73 |
| 2013/0065584 A1* | 3/2013 | Lyon | H04W 28/06 455/434 |
| 2015/0172902 A1* | 6/2015 | Kasslin | H04L 45/745 370/328 |
| 2015/0215781 A1* | 7/2015 | Reed | H04L 9/3236 726/5 |
| 2016/0100276 A1 | 4/2016 | Viswanadham et al. | |
| 2016/0249292 A1 | 8/2016 | Viswanadham et al. | |
| 2018/0295660 A1* | 10/2018 | Choi | H04W 4/80 |

FOREIGN PATENT DOCUMENTS

| | | |
|---|---|---|
| CN | 102083005 A | 6/2011 |
| CN | 102782665 A | 11/2012 |
| WO | 2016178542 A1 | 11/2016 |

OTHER PUBLICATIONS

Bluetooth Specification Version 5.0, vol. 6, Part B p. 2586 "ACAD filed", Dec. 6, 2016 (Year: 2016).*
PCT Written Opinion of the International Search Authority of corresponding application CN2018/090828 (dated 2018).*

* cited by examiner

*Primary Examiner* — David Bilodeau

(57) ABSTRACT

Processing of wireless advertising packets can be processed by a controller when the advertising packet includes an indication of a preference for processing the advertising packet by the controller. If the advertising packet does not include an indication of a preference for processing the advertising packet by the controller, the advertising packet can be processed by a host. In addition, if the advertising packet includes an indication of a preference for processing by the controller, but the controller cannot process the advertising packet, the advertising packet can be processed by the host.

22 Claims, 9 Drawing Sheets

BLUETOOTH ADVERTISING PROCESSING TECHNIQUES

CROSS-REFERENCE TO RELATED APPLICATIONS

This Application claims the benefit of U.S. Patent Provisional Application No. 62/518,016 filed Jun. 12, 2017, which is incorporated herein in its entirety.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, Internet-of-Things (IoT) devices and the like have facilitated increased productivity and reduced costs in communicating and analyzing data in most areas of entertainment, education, business, and science. One common aspect of such computing devices is the wireless communication of data between devices.

Bluetooth® is a wireless communication standard that uses short-range radio links to communicate data between computing devices in a Wireless Personal Area Network, and wireless access to Local Area Networks (LANs), Public Switched Telephone Network (PSTN), mobile telephone networks, and the like. The Bluetooth protocol can utilize advertising techniques to broadcast information to other devices and establish connections between devices. However, processing of the advertising packets may impact the performance of Bluetooth devices. Accordingly, there is a continuing need for improved advertising packet processing techniques.

SUMMARY OF THE INVENTION

The present technology may best be understood by referring to the following description and accompanying drawings that are used to illustrate embodiments of the present technology directed toward techniques for processing wireless advertising messages.

In one embodiment, the techniques can include determining, by a wireless controller of an observer device, if an advertising message includes an indication of a preference for processing one or more portions of the advertising message by the wireless controller. In one implementation, the indication of the preference for processing the advertising message by the wireless controller can be encoded as in a data type field corresponding to the data for preferred processing by the wireless controller. When the advertising message includes the indication of the preference for processing the advertising message by the wireless controller, the wireless controller of the observer device can process the corresponding one or more portions of the advertising message. When the advertising message does not include the indication of the preference for processing the advertising message by the wireless controller, the wireless controller can send the advertising message to a wireless host for processing.

In another embodiment, a wireless controller of an observer device can determine if an additional controller advertising data (ACAD) field includes an indication of a preference for processing by the wireless controller. When the ACAD field does not include an indication of a preference for processing the ACAD field by the wireless controller, the wireless controller can process the corresponding one or more portions of the ACAD field. When the ACAD field includes an indication of a preference for processing the ACAD field by the wireless controller, the wireless controller can determine if it can process the ACAD field. When the ACAD field cannot be processed by the wireless controller, the wireless controller can extract data from the ACAD field and send the extracted data to a wireless host of the observer device for processing. When the ACAD filed can be processed by the wireless controller, the wireless controller can process the corresponding one or more portions of the ACAD field.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
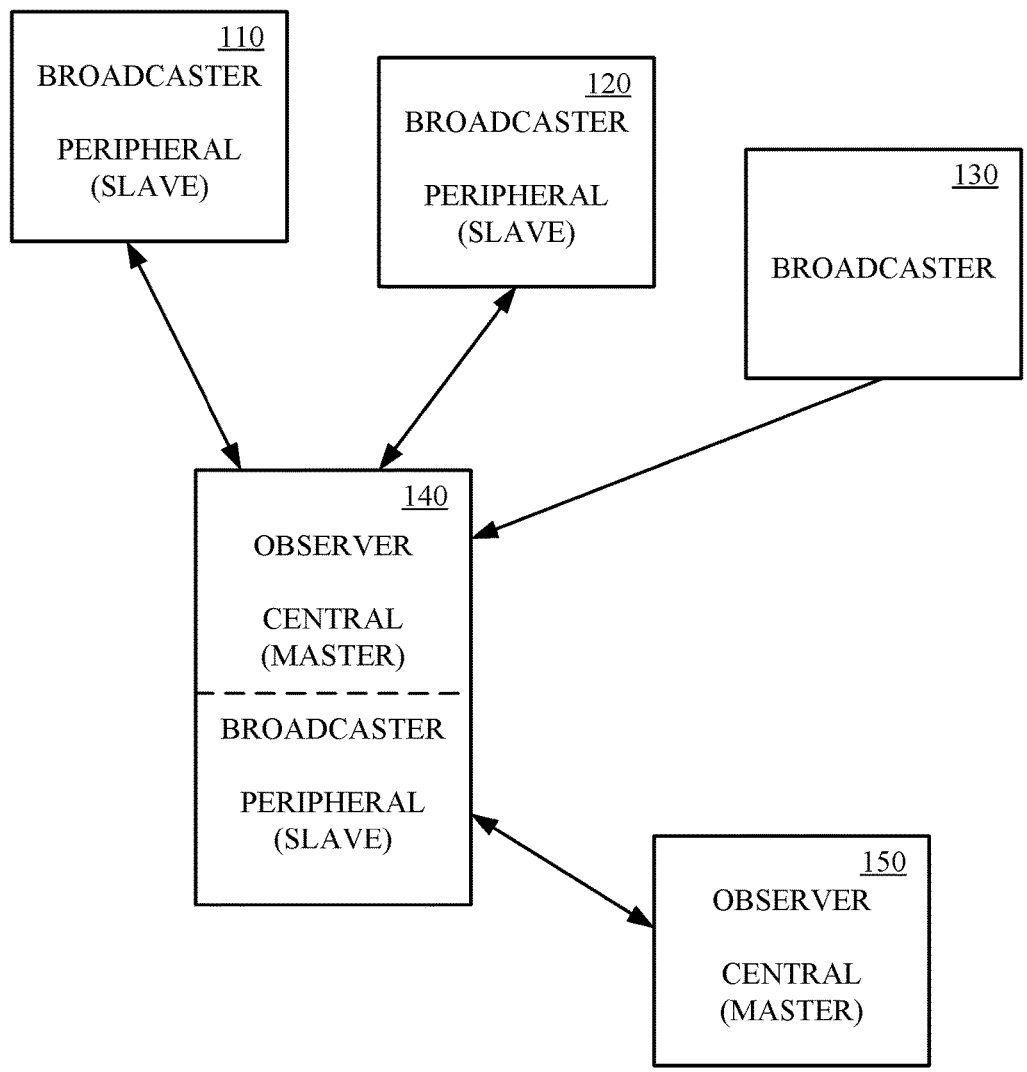
FIG. 1 shows a block diagram of a Bluetooth® network, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

FIG. 1, a block diagram of a Bluetooth® network, in accordance with aspects of the present technology, is shown. The network can include a plurality of Bluetooth enabled computing devices 110-150. The Bluetooth enabled computing devices 110-150 can be desktop Personal Computers (PCs), laptop PCs, tablet PCs, printers, smart phones, smart televisions, gaming consoles, infotainment centers, Internet-of-Thing (IoTs) devices, and the like. Each device 110-150 can be characterized according to its broadcasting role, and/or its connecting role. A broadcaster 130-140 can be a device that broadcasts public advertising data packed but does not have an explicitly connection to another device to transfer data. An observer device 140, 150 can listen to the data in the advertising packets sent by a broadcaster. However, no connection happens between broadcasting devices and observer devices. In connecting roles, devices explicitly connect and handshake to transfer data. A peripheral device 110-140 can advertise its presence so central devices can establish a connection. A central device 140, 150 can initiate a connection with a peripheral device 110-140 by first listening to advertising packets broadcast by a device. When a central device wants to connect to a peripheral device, the central device can send a request connection data packet to the peripheral device. If the peripheral device accepts the request from the central device, a connection can be established. Aspects of the present technology are primarily directed toward advertising in the broadcasting role, and therefore the connection role will not be discussed in further detail.

Figure 2:
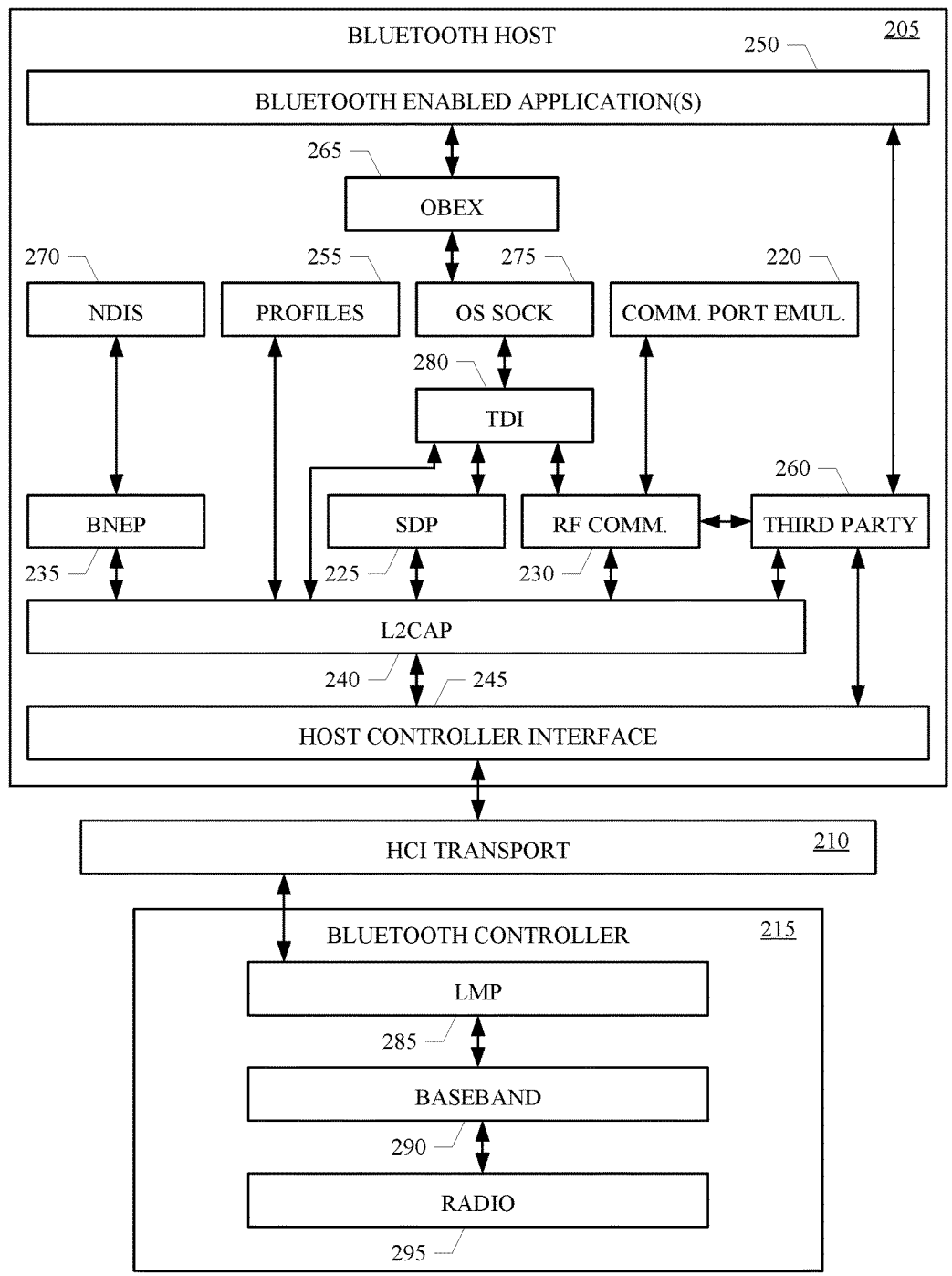
FIG. 2 shows a block diagram of a Bluetooth® device, in accordance with aspects of the present technology.

FIG. 2, a block diagram of a Bluetooth® device, in accordance with aspects of the present technology, is shown. The Bluetooth architecture can include a Bluetooth Host layer 205, a Host Controller Interface (HCI) transport layer 210, and a Bluetooth Controller layer 215. The Host 205 can be configured to implement the core Bluetooth protocols, including the Bluetooth stack and the high-level layers of the Bluetooth architecture, such as Application Specific Interfaces (APIs) and profiles. The Controller 215 can be configured to implement the lower levels of the Bluetooth architecture. The HCI transport layer 210 can be configured to deliver data between the Host 205 and the Controller 215. Each layer can be a collection of components that include protocol implementations for APIs, application, services, and the like.

In one implementation, the Host 205 can include the logical layer of the Bluetooth architecture such as Bluetooth Stack components 220-245, profile components 250-260, and Operating System Embedded Compact components 265-280. The Bluetooth Stack components 220-245 can include a COM Port Emulation layer 220 that can support virtual COM ports over RFCOMM channels, a Service Discovery Protocol (SDP) layer 225 that can manage the discovery and publishing of supported Bluetooth services and parameters between devices, a Radio Frequency Communications (RFCOMM) Serial Port Emulation layer 230 that can emulate RS-232 serial ports over the L2CAP layer 240, a Bluetooth Network Encapsulation Protocol (BNEP) layer 235 that can encapsulate network packets into a standard format so they can be transmitted over the L2CAP layer 240, and the Logical Link Control and Adaptation Protocol (L2CAP) layer that can communicate directly with a HCI 245 to provide the Bluetooth Stack component 220-245 with access to the Controller 215. The profile components 250-160 can include a Bluetooth-Enabled Applications layer 250 that can implement Bluetooth functionality, a Profile layer 255 to provide specifications that describe Bluetooth application and how Bluetooth devices communicate, and a Stack Extension layer 260 that can provide Bluetooth-enabled application with access to the layer of the Bluetooth Stack 220-245.

The Controller 215 can include a Link Manager Protocol (LMP) layer 285 that can manage logical link establishment between Bluetooth device, a Baseband layer 290 that can form the physical layer of the Bluetooth architecture, and a Radio layer 295 that can transmit and receive data. Details concerning the Host 205, HCI transport 210 and Controller 215 are provided in the Bluetooth protocol specifications and therefore further general description of the Bluetooth architecture that are not germane to an understanding of aspects of the present technology will not be described further herein.

The Bluetooth protocol can provide for discovery and setup of services between devices. The Bluetooth protocol can also advertise the services that the devices provide. In one implementation, advertising techniques, in the Bluetooth Low Energy (BLE) protocol subset, can provide for the rapid build-up of simple links between computing devices. Using advertisements, a device can broadcast packet to every device around it. A receiving device can act on information in the broadcast packet or connect to the broadcasting device to receive more information. In BLE, a device can be in a low power mode most of the time and enter an operating mode to advertise and connect when needed. The advertisement packets can be sent, on predetermined channel of the 2.4 GHz spectrum used by Bluetooth. For BLE, the advertisement packets can be sent by a peripheral device on Channels 37, 38 and 39 periodically with both a fixed interval and a random delay. The fixed interval with the random delay can help to reduce collisions between advertisements from different devices. A central device scanning for devices or beacons can listen to the predetermined channels for the advertisement packets, which helps it discover devices nearby.

Figure 3:
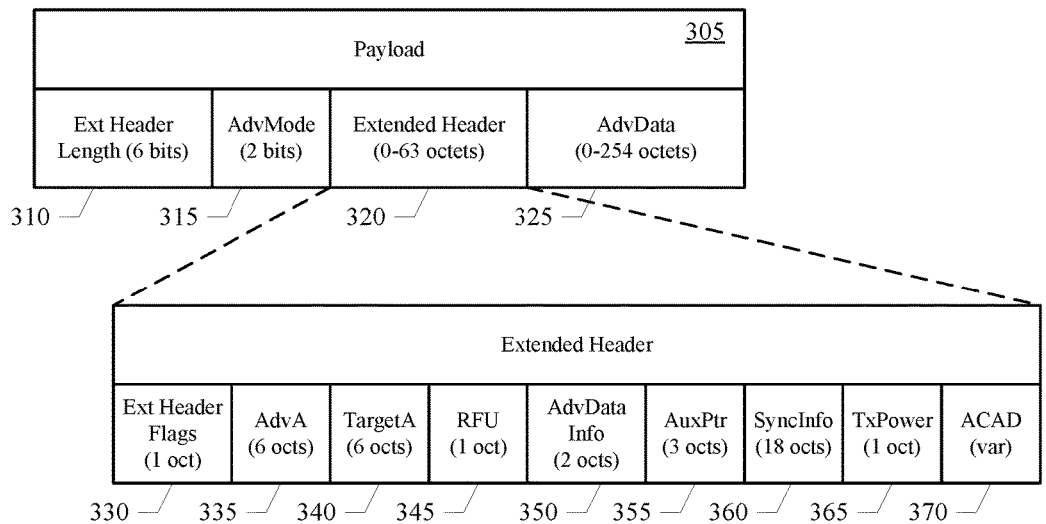
FIG. 3 shows an extended advertising payload format, in accordance with aspects of the present technology.
Figure 4:
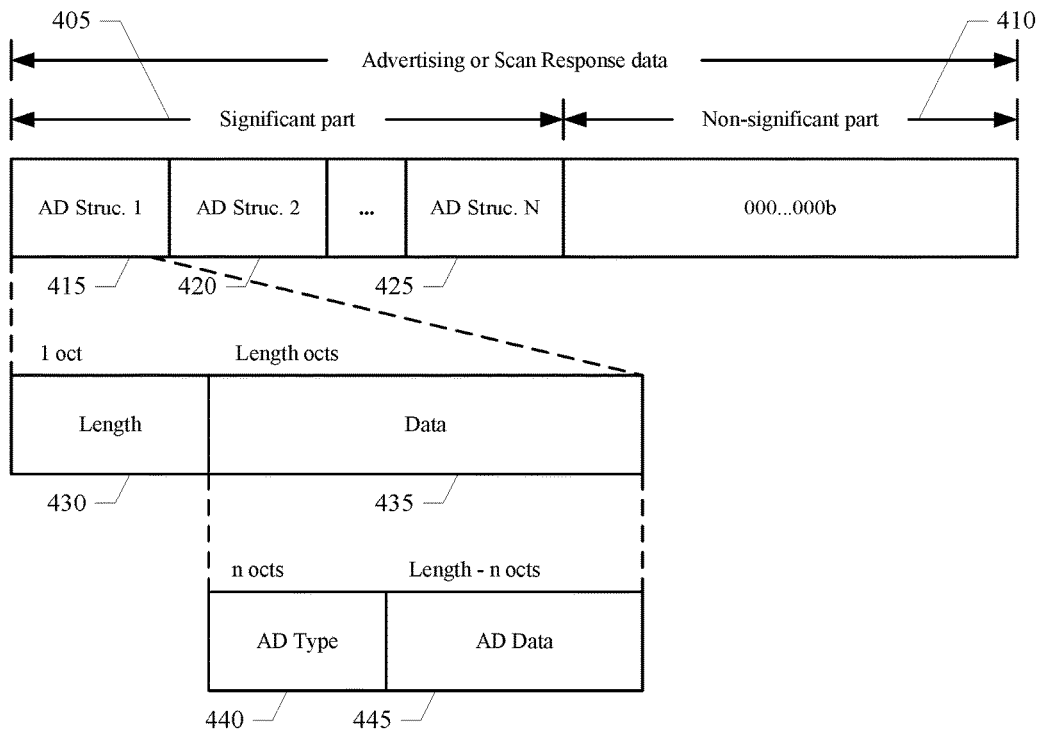
FIG. 4. shows a format of the AdvData field in accordance with aspects of the present technology.

When a broadcaster device 110-140 is advertising it can periodically transmit packets containing information such as preamble, access address, CRC, Bluetooth address of sender, and the like. Referring now to FIG. 3, an extended advertising payload format, in accordance with aspects of the present technology, is shown. The extended advertising payload format 305 can include an extended header length 310, an advertisement mode (AdvMode) 315, an extended header 320, and advertisement data (AdvData) 325. In one implementation, the extended header length 310 can comprise 6 bits that can define the length of the extended header. The advertisement mode 315 can comprise 2 bits that can define modes such as non-connectable and non-scannable, connectable and non-scannable or non-connectable and scannable. The extended header 320 can comprise 0-63 octets of bits that can define attributes of the extended advertising event. The advertisement data 325 can comprise 0-254 octets of bits that can contain advertising data. The format of the extended. header 320, as illustrated in FIG. 4. can include extended header flags field 330, AdvA field 335, TargetA field 340, RFU field 345, ADI field 350, AuxPtr field 355, SyncInfo field 360, TxPower field 365, and ACAD field 370. The extended header flags field 330 can comprise 1 octet of bits that can indicate which extended header fields 335-370 are present. The AdvA field 335 can comprise six octets of bits that can contain the advertiser's device address. The TargetA field 340 can comprise six octets of bits that can contain the address of the observer device to which the advertisement is directed. The RFU field 350 can comprise one octet of bits reserved for future use. The ADI field 350 can comprise two octets of bits that can identify different advertising sets and identify if the advertising data is a duplicate. The AuxPtr field 355 can comprise three octets of bits that can indicate whether some or all of the advertising data in in a subsequent auxiliary packet. The SyncInfo field 360 can comprise 18 octets of Kits that can indicate the presence of a periodic advertisement. The TxPower field 365 can comprise one octet of bits that can indicate the transmission power level. The ACAD field 370 can comprise the remainder of the extended header 320 that includes the additional controller advertising data. In one implementation, the ADV_EXT_IND, AUX_ADV_IND, AUX_S-CAN_RSP, AUX_SYNC_IND, AUX_CHAIN_IND, AND AUX_CONNECT_RSP advertising channel PDUs can share the same extended advertising channel PDU payload format illustrated in FIG. 3.

In aspects, the ACAD field 370 cannot be fragmented across multiple advertising data Protocol Data Units (PDUs). The ACAD field 370 can fit inside a single advertising data PDU. The ACAD field 370 can hold data from a controller 115 of a broadcaster 130, and can be intended to be used by a controller 115 of an observer 140. The ACAD field 370 can use the same format at the AdvData field 325 in various advertising channel PDUs. In aspects, the AdvData field 325 may contain advertising data from a host 105 of a broadcaster, and can be intended to be used by a host 105 and an observer 140.

Referring now to FIG. 4, a format of the AdvData field in accordance with aspects of the present technology is shown. The AdvData field 325 can include a significant part 405 and a non-significant part 410. The significant part 405 can include a sequence of one or more advertising data (AD) structures 415-425. Each AD structure can include a length field 430, which contains a length of octets value, and a data field 435 of the length of octets. The first octet of the data field can include an AD type field 440, with the rest containing the AD data 445. The non-significant part 410 extends the AdvData field 325 and can contain all-zero octets when needed to fill the AdvData field 325. However, the non-significant part 410 may not be transmitted. In addition, the scan response may have the same format as the AdvData field 325. Conventionally, the ACAD and AdvData can share the same format. The ACAD is conventionally processed by the controller, and the AdvData is processed by the host.

Figure 5:
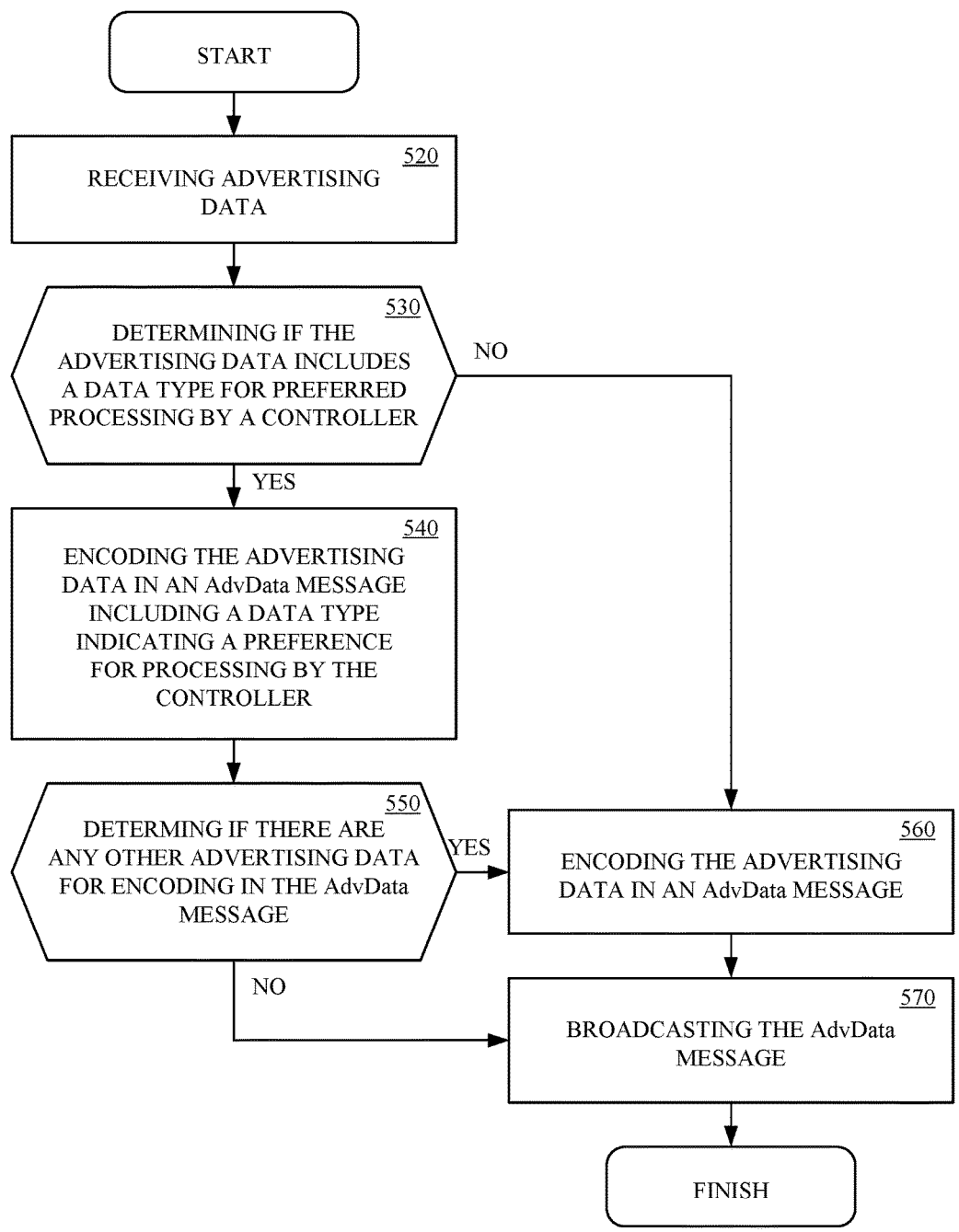
FIG. 5 shows a method of processing Advertising Event (AE) packets by a host, in accordance with aspects of the present technology.
Figure 6:
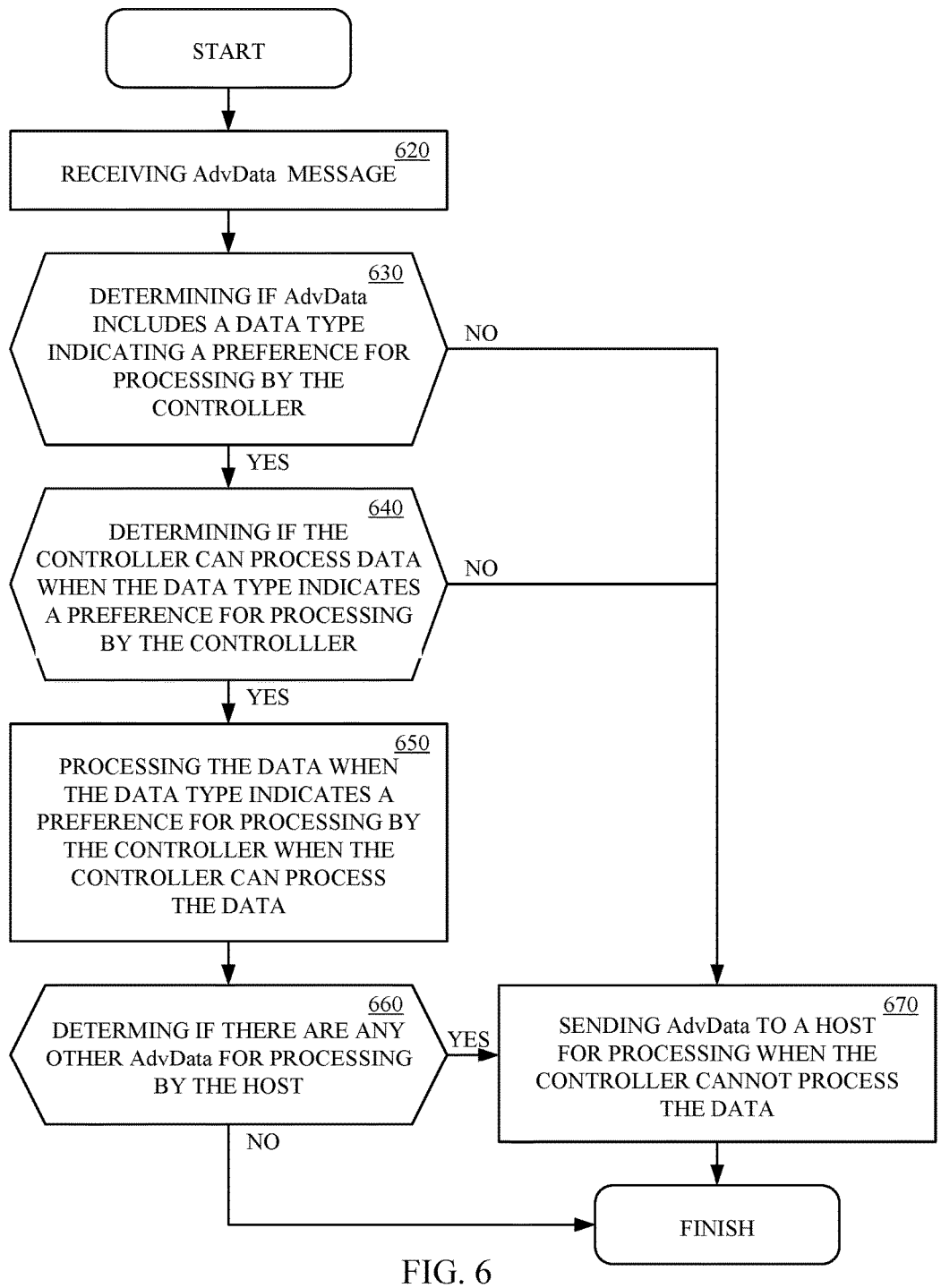
FIG. 6 shows a method of processing Advertising Event (AE) packets by a controller, in accordance with aspects of the present technology.

Referring now to FIGS. 5 and 6, a method of processing Advertising Event (AE) packets, in accordance with aspects of the present technology. The method may be implemented as computing device-executable instructions (e.g., computer program) that are stored in computing device-readable media (e.g., computer memory) and executed by a computing device (e.g., processor). The method includes the use of an Advertising Data (AD) data type that indicates a preference for processing the data in the packet by a Bluetooth Controller subsystem. If the controller subsystem can process the data in accordance with the indicated preference, the data can be processed by the controller instead of the host. If the controller subsystem cannot process the data in accordance with the indicated preference, the data can be sent to the Bluetooth host subsystem for processing. The method can include carrying the AD data type in an advertising channel packet data unit (PDU). A controller of an observer can check if it can process the AD data type. If the AD data type can be processed by the controller, the data is extracted from the advertising data and processed by the controller. If the AD data type cannot be processed by the controller, the data is kept intact and sent to the host for further processing.

Figure 7:
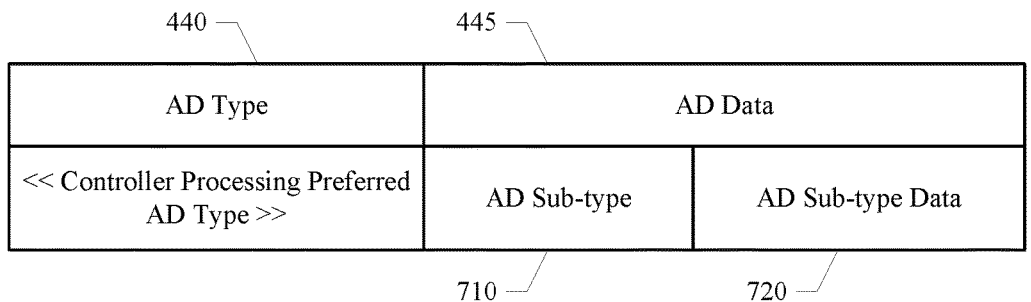
FIG. 7 shows an exemplary AD data format, in accordance with as of the present technology.

In aspects, a method of processing AE packets by a host 205 of a broadcaster (e.g., advertiser), as illustrated in FIG. 5, can include receiving advertising data, at 520. The host 205 can determine if the advertising data includes a data type for preferred processing by a controller 215 of an observer (e.g., recipient), at 530. The advertising data can be encoded along with a data type indicating a preference for processing by a controller of the observer in an advertising message, at 540, when it is determined that the advertising data includes a data type for preferred processing by the controller. In one implementation, the advertising message can be a Bluetooth Low Energy (BLE) AdvData packet. Referring now to FIG. 7, an exemplary AD data format, in accordance with aspects of the present technology is shown. The AD data format can include an AD type 440 and AD Data 445. The data type indicating a preference for processing by a controller can be encoded as a given value. In aspects, the AD Data 445 may optionally include an AD sub type 710 and an AD sub-type data 720 to provide further variants.

The host can also determine if there are any other advertising data for encoding in the advertising message, at 550. When there is additional advertising data, the advertising data can be encoded in the advertising message, at 560. The advertising data can also be encoded with a data type that does not indicate a preference for processing, by the controller of the observer in an advertising message, at 560, when it is determined that the advertising data does not include a data type for preferred processing by the controller. The advertising message, after encoding of the advertising data, can be broadcast to one or more observers, 570.

In aspects, a method of processing AE packets by a controller 215 of an observer, as illustrated in FIG. 6, can include receiving an advertising message, at 620. In one implementation, the advertising message can be a Bluetooth Low Energy (BLE) AdvData packet. The controller can determine if the advertising message includes a data type indicating a preference for processing by the controller, at 630. Referring again to FIG. 7, the AD data format can include an AD type 440 and AD Data 445. The data type indicating a preference for processing by a controller can be encoded as a given value. In aspects, the AD Data 445 may optionally include an AD sub-type 710 and an AD sub-type data 720 to provide further variants. When the advertising message includes a data type indicating a preference for processing by the controller, the controller can also determine if the controller can process the data having the data type indicating a preference for processing by the controller, at 640. When the controller can process the data having the data type indicating a preference for process by the controller, the data can be processed by the controller, at 650. The controller can also determine if there is any other data in the advertising message for processing by the host, at 660. When the advertising message does not include a data type indicating a preference for processing by the controller, the controller cannot process the data having a data type indicating a preference for processing by the controller, and/or there is other data in the advertising message for processing by the host, the controller can send the advertising message to the host for processing, at 670.

Conventionally, the AdvData is processed by the host 205. However, the host 205 of the observer needs to be woken up from a low power state to process the AdvData. Therefore, including, a data type indicating a preference for processing by the controller 215 advantageously allows the host 205 to remain in the low power state if the controller 215 of the observer can process the AdvData. However, the data type indicating a preference for processing by the controller 215 advantageously provides for backward compatibility in the situations where the controller 215 of the observer cannot process the given AdvData.

Figure 8:
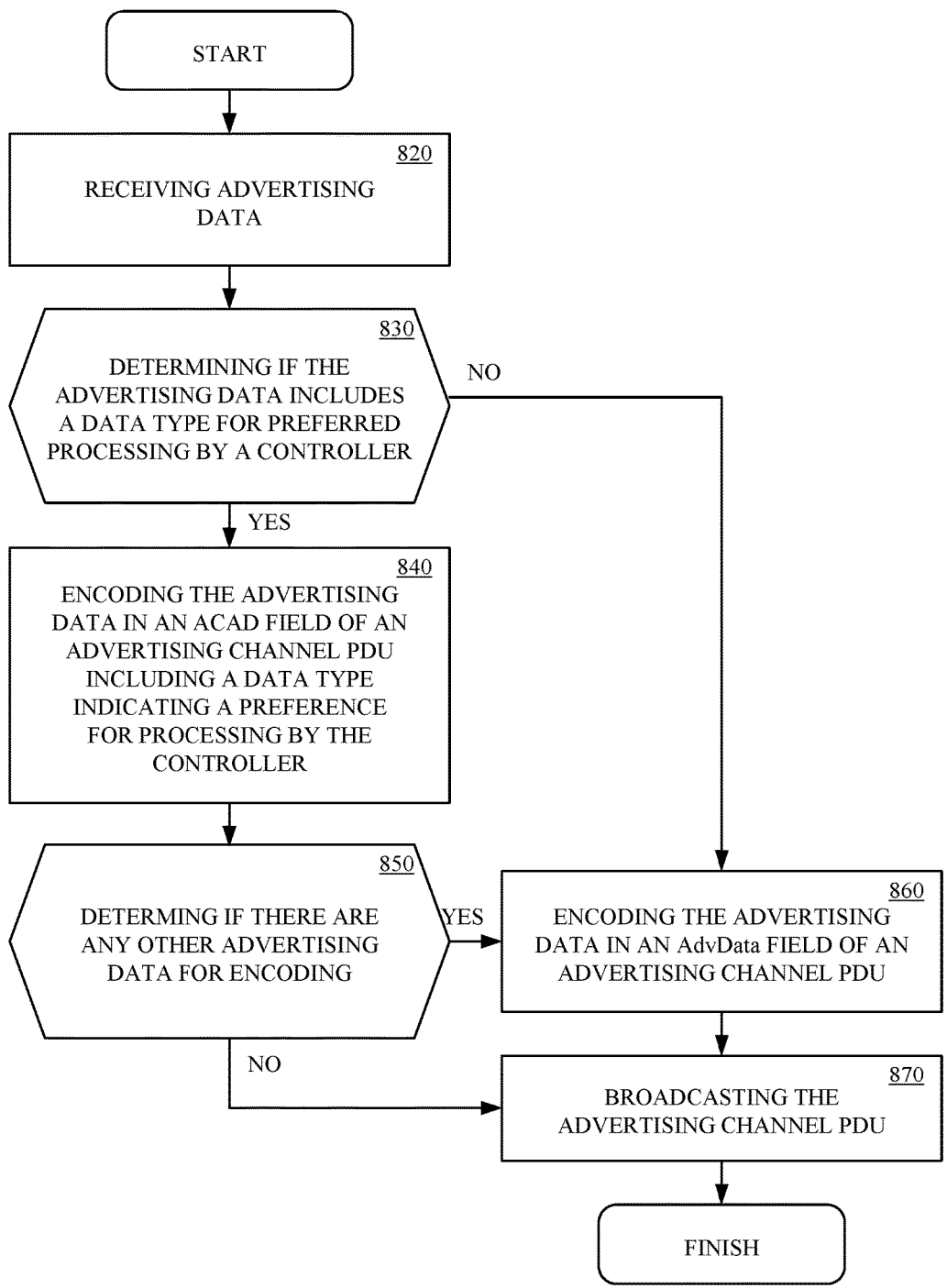
FIG. 8 shows a method of processing Advertising Event (AE) packets by a host, in accordance with aspects of the present technology.
Figure 9:
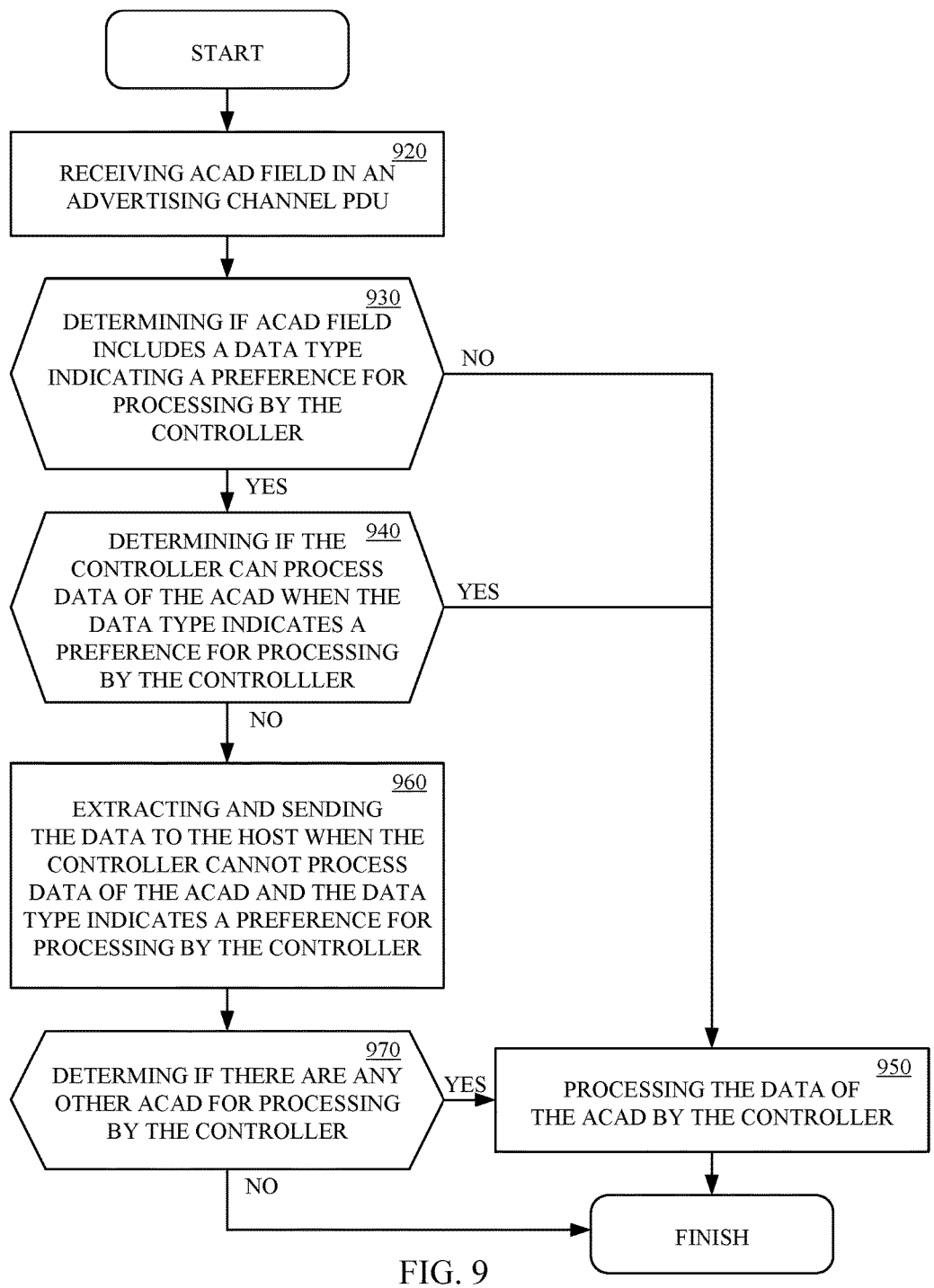
FIG. 9 shows a method of processing Advertising Event (AE) packets by a controller, in accordance. with aspects of the present technology.

Referring now to FIGS. 8 and 9 a method of processing Advertising Event (AE) packets, in accordance with aspects of the present technology. The method may be implemented as computing device-executable instructions (e.g., computer program) that are stored in computing device-readable media (e.g., computer memory) and executed by a computing device (e.g., processor). The method includes the use of an Advertising Data (AD) data type that indicates a preference for processing the data in the packet by a Bluetooth Controller subsystem. If the controller subsystem can process the data in accordance with the indicated preference, the data can be processed by the controller instead of the host. If the controller subsystem cannot process the data in accordance with the indicated preference, the data can be sent to the Bluetooth host subsystem for processing. The method can include carrying the AD data type in an ACAD field. When it is carried in the ACAD field, a controller of an observer can check if it can process the data type of the ACAD field. If the data type of the ACAD field can be processed by the controller, the data is processed by the controller. If the ACAD cannot be processed by the controller, the data type can be extracted from the ACAD field and sent to a host of the observer for further processing. The method can also include the controller configured to extract advertising data that is preferably to be processed by the controller but cannot be processed by the controller from an advertising data packet and moved to an ACAD field in an advertising PDU before transmission to the host.

In aspects, a method of processing AE packets by a host 205 of a broadcaster (e.g., advertiser), as illustrated in FIG. 8, can include receiving advertising data, at 820. The host 205 can determine if the advertising data includes a data type for preferred processing by a controller 215 of an observer (e.g., recipient), at 830. The advertising data can be encoded along with a data type indicating a preference for processing by a controller of the observer in an additional controller advertising data (ACAD) field of an advertising channel PDU, at 840, when it is determined that the advertising data includes a data type for preferred processing by the controller. In one implementation, the advertising channel PDU can be a Bluetooth Low Energy (BLE) advertising channel PDU with an (ACAD) field. Referring again to FIG. 7, the AD data format can include an AD type 440 and AD Data 445. The data type indicating a preference for processing by a controller can be encoded as a given value. In aspects, the AD Data 445 may optionally include an AD sub-type 710 and an AD sub-type data 720 to provide further variants.

The host can also determine if there are any other advertising data for encoding in the advertising channel PDU, at 850. When there is other advertising data, the advertising data can be encoded in an AdvData field of the advertising channel PDU, at 860. When it is determined that the advertising data does not include a data type for preferred processing by the controller, the advertising data can also be encoded in an Adv Data field of the advertising channel PDU, at 860. The advertising channel PDU can be broadcast to one or more observers, at 870.

In aspect, a method of processing AE packets by a controller 215 of an observer, as illustrated in FIG. 9, can include receiving an ACAD field in an advertising channel PDU, at 920. In one implementation, the advertising channel PDU can be a Bluetooth Low Energy (BLE) with an ACAD field. The controller can determine if the ACAD field includes a data type indicating a preference for processing by a controller, at 930. Referring again to FIG. 7, the AD data format can include an AD type 440 and AD Data 445. The data type indicating a preference for processing by a controller can be encoded as a given value. In aspects, the AD Data 445 may optionally include an AD sub-type 710 and an AD sub-type data 720 to provide further variants. When the ACAD field includes a data type indicating a preference for processing by the controller, the controller can also determine if the controller can process the data having the data type indicating a preference for processing by the controller, at 940. When the controller can process the data having the data type indicating a preference for processing by the controller, the data of the ACAD can be processed by the controller, at 950. In addition, when ACAD field does not include a data indicating a preference for processing by the controller, the data of the ACAD can be processed by the controller, at 950. When the controller cannot process the data of the ACAD and the data type indicates a preference for processing by the controller, the controller can extract and send data to a host, at 960. The controller can also determine if there is any other advertising data in the ACAD for processing by the controller, at 970.

When there is other data in the ACAD for processing by the controller, the additional data of the ACAD can be processed by the controller, at 950.

Conventionally, the ACAD is processed by the controller 215. However, the controller 215 of the observer may be hardware constrained, such as baying limited computing device readable memory (e.g., Random Access Memory (RAM) and/or Read Only Memory (ROM)), and therefore may be less readily upgradeable to support new functions. In contrast, the host 205 may more readily be upgradable by software to accommodate new functions. Accordingly, a data type can indicate a preference for processing an ACAD message by the controller of the observer to enable new controllers with appropriate functionality to process the data. However, if the controller 215 is not able to process the ACAD data type, the data can be extracted from the ACAD and sent to the host 205 as an AdvData fur further processing by the host 205 that can be readily updated with new functionality to support new data types.

Figure 10:
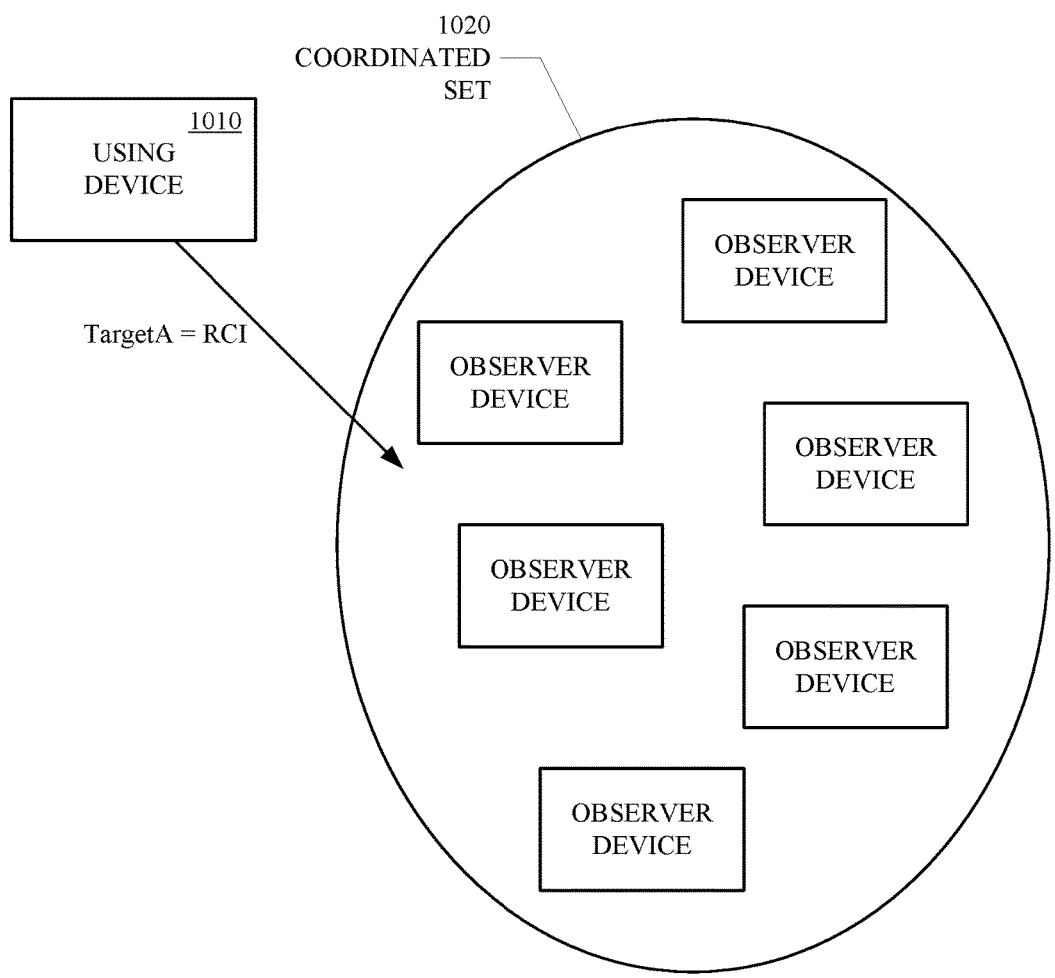
FIG. 10 shows a block diagram of a Bluetooth® network, in accordance with aspects of the present technology.

In aspects, a Resolvable Coordinate Identifier (RCI) address type can be treated as a device address and sent in address fields of advertising PDUs as an additional way to address a device that is part of a coordinated set. Referring now to FIG. 10, a block diagram of a Bluetooth® network, in accordance with aspects of the present technology, is shown. The network can include a using device 1010 and a coordinated set 1020 of observer devices. The RCI data type can be valid in the ACAD context and a controller can optionally support the resolution of a RCI sent as either a data type in the ACAD or as an address type. The RCI can be sent to the host for further processing together with the advertising data if the controller does not support RCI resolution. RCI resolution in the controller allows filtering on RCI. Members can identify themselves as belonging to a coordinated set by exposing the RCI or by including the RCI in the AdvA of an advertising PDU. Accordingly, using device 1010 can discover the members of the set 1020.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   receiving by a wireless controller, an advertising message;
   determining, by the wireless controller, if the advertising message includes an indication of a preference for processing the advertising message by the wireless controller;
   processing, by the wireless controller, the advertising message when the advertising message includes the indication of the preference for processing the advertising message by the wireless controller; and
   sending, from the wireless controller, the advertising message to a wireless host when the advertising message does not include the indication of the preference for processing the advertising message by the wireless controller.

2. The method according to claim 1, wherein,
   the wireless controller comprises a Bluetooth controller; and
   the wireless host comprises a Bluetooth host.

3. The method according to claim 2, wherein the advertising message comprises a Bluetooth Low Energy (BLE) advertising data (AdvData) packet.

4. The method according to claim 1, wherein the indication of the preference for processing the advertising message by the wireless controller is encoded as a data type in the advertising message.

5. The method according to claim 1, further comprising:
   determining, by the wireless controller, if the wireless controller can process the advertising message when the advertising message includes the indication of the preference for processing the advertising message by the wireless controller;
   processing, by the wireless controller, the advertising message further when the wireless controller can process the advertising message; and
   sending, from the wireless controller, the advertising message to the wireless host further when the wireless controller cannot process the advertising message.

6. The method according to claim 1, further comprising:
   determining, by the wireless controller, if there is additional data in the advertising message for processing by the wireless host; and
   sending, from the wireless controller, the additional data of the advertising message to the wireless host when there is additional data in the advertising message for processing by the host.

7. A method comprising:
   receiving, by a wireless host, advertising data;
   determining, by the wireless host, if the advertising data includes data for preferred processing by a wireless controller;
   encoding, by the wireless host, the advertising data in an advertising message including an indication for preferred processing by the wireless controller; and
   broadcasting the advertising message.

8. The method according to claim 7, wherein,
   the wireless controller comprises a Bluetooth controller; and
   the wireless host comprises a Bluetooth host.

9. The method according to claim 8, wherein the advertising message comprises a Bluetooth Low Energy (BLE) advertising data (AdvData) packet.

10. The method according to claim 7, wherein the indication for preferred by the wireless controller is encoded as a data type in the advertising message.

11. The method according to claim 7, further comprising:
    encoding, by the wireless host, additional data in the advertising message for processing.

12. A method comprising:
    receiving, by a wireless controller, an additional controller advertising data (ACAD) field in an advertising channel Protocol Data Unit (PDU);
    determining, by the wireless controller, if the ACAD field includes an indication of a preference for processing data in the ACAD field by the wireless controller;
    processing, by the wireless controller, the ACAD when the ACAD field does not include the indication of the preference for processing the ACAD by the wireless controller;
    determining, by the wireless controller, if the wireless controller can process the ACAD when the ACAD field includes the indication of the preference for processing the ACAD by the wireless controller;

extracting, by the wireless controller, data from the ACAD when the wireless controller cannot process the ACAD when the ACAD field include the indication of the preference for processing alae ACAD by the wireless controller; and sending, from the wireless controller, the data extracted from the ACAD field to a wireless host when the wireless controller cannot process the ACAD when the ACAD field include the indication of the preference for processing the ACAD by the wireless controller.

13. The method according to claim 12, wherein, the wireless controller comprises a Bluetooth controller; and the wireless host comprises a Bluetooth host.

14. The method according to claim 13, wherein the ACAD field comprises a Bluetooth Low Energy (BLE) ACAD field.

15. The method according to claim 12, wherein the indication of the preference for processing the ACAD by the wireless controller is encoded as a data type in the ACAD field.

16. The method according to claim 12, further comprising:

processing, by the wireless controller, the ACAD further when the wireless controller can process the ACAD and when the ACAD field includes the indication of the preference for processing the ACAD by the wireless controller.

17. The method according to claim 12, further comprising:

determining, by the wireless controller, if there is additional data in the ACAD field for processing by the wireless controller; and processing, by the wireless controller, the additional data in the ACAD field.

18. A method comprising:

receiving, by a wireless host, advertising data;

determining, by the wireless host, if the advertising data includes data for preferred processing by a wireless controller;

encoding, by the wireless host, the advertising data in an advertisement data (AdvData) field of an advertising channel Protocol Data Unit (PDU) including an indication for preferred processing by the wireless controller; and broadcasting the advertising channel PDU.

19. The method according to claim 18, wherein, the wireless controller comprises a Bluetooth controller; and the wireless host comprises a Bluetooth host.

20. The method according to claim 19, wherein the ACAD field comprises a Bluetooth Low Energy (BLE) ACAD field.

21. The method according to claim 18, wherein the indication for preferred processing by the wireless controller is encoded as a data type in the ACAD field.

22. The method according to claim 18, further comprising:

encoding, by the wireless host, additional data in the ACAD for processing.

* * * * *